United States Patent Office 2,867,639

Patented Jan. 6, 1959

1

2,867,639

PROCESS FOR STABILIZING AND REFINING TUNG OIL AND PRODUCT THEREOF

John Andrew Watts, Long Beach, Miss., assignor to The Tungolin Company, Inc., Long Beach, Miss., a corporation of Mississippi No Drawing. Application August 13, 1954
Serial No. 449,799

8 Claims. (Cl. 260—428)

This invention relates to a new and improved process for stabilizing and refining tung oil and the highly refined product thereof, the properties of which make it particularly useful for therapeutic and cosmetic purposes.

Raw tung oil is unstable because of the tendency of glyceryl $\alpha$-elaeostearate, which ordinarily comprises about 75–85% of the oil, to change over to the solid $\beta$-form in the presence of light. The instability greatly limits its usefulness. The tendency toward $\beta$-compound formation may be checked by heating or thermolizing the oil to a temperature of about 475–500° F. but this treatment is disadvantageous in as much as the heat treated oil becomes so highly viscous that it is difficult to pour and also darkens considerably in color. Heating, furthermore, does not eliminate the heavy odor which many people find objectionable. These objectionable characteristics, namely high viscosity, odor and high degree of coloration, which frequently causes staining, limit considerably therapeutic and cosmetic use of the oil.

The object of this invention is to provide a process for producing a stable tung oil of light color and substantially reduced, inoffensive odor, which is further characterized by low viscosity.

Another object is to produce a stable, refined tung oil which is particularly useful for therapeutic and cosmetic use.

Other objects and advantages will become obvious from the following detailed description.

The process comprises heating raw tung oil under agitation to a temperature of about 170–190° F., preferably about 180° F., adding about 5 to 10% of a finely divided solid adsorbent to the oil with continued agitation, maintaining the mixture of oil and adsorbent at the 170–190° temperature for about 15 to 30 minutes, preferably about 20 minutes, under continued agitation and then separating the adsorbent from the oil in any suitable manner as, for example, by filtration or centrifuging.

A portion of the treated oil is then heated with continued agitation to about 475–500° F., preferably about 500° F. The higher the temperature, the shorter, desirably, is the time of treatment. For example, the oil is preferably maintained at a temperature of about 475° F. for about 10 to 15 minutes. When the oil is heated to 500° F., heating may be discontinued as soon as the oil reaches temperature. Preferably, the oil is raised to the high thermolizing temperature gradually. The thermolized oil is then recombined with the tung oil which has been given the treatment with solid adsorbent only, namely the portion which has been subjected to a maximum temperature of about 190° F.

If desired, the solid adsorbent may be added to the raw oil prior to heating to the 170–190° temperature. The oil may also be partially heated as, for example, to 150–160° F. prior to addition of the adsorbent and then heated to 170–190° F.

The tung oil may be treated in two separate batches, if desired, one batch being treated with solid adsorbent as aforedescribed and then heated to 475–500° F. and another batch being given only the treatment with solid adsorbent and being subjected to a maximum temperature of about 190° F. The two treated batches may then be combined in the requisite proportions of thermolized to non-thermolized oil.

2

Treatment of the tung oil with a solid adsorbent removes both color and odorous impurities. The temperature of the oil during such treatment should not be less than about 170° F. since substantial decolorization and deodorization are not obtained below this temperature. Temperatures above about 190° F. should be avoided since above this temperature viscosity of the oil increases rapidly. Although the portion of the tung oil which is heat treated at 475–500° F. becomes highly viscous, this is of no moment since the viscosity is sharply reduced upon recombination with the low-viscosity tung oil which has not been subjected to high temperatures.

Not only does the high temperature treatment stabilize the portion of the oil so treated against conversion into the solid $\beta$-form, but I have found that addition of a portion of such oil to non-thermolized oil also stabilizes the resulting mixture. To obtain such stabilization at least 20% of the tung oil must be given the high temperature treatment. So long as it is in minor proportion, the amount of high-temperature treated oil may be increased as much as desired if viscosity of the finished product is not an important factor for the particular use. However, if a low-viscosity product is desired, it is preferable not to increase the proportion of the thermolized oil by much over 30%. Viscosity of the final product is not appreciably higher than that of the low-viscosity, non-thermolized portion when the proportion of thermolized oil is about 20 to 30%. Viscosity increases markedly with proportions above 30%. In general use of about 25% of the thermolized oil is particularly satisfactory.

Any suitable solid adsorbent can be used as the decolorizing and deodorizing medium such as activated clay, activated charcoal, fuller's earth, bentonite, silica and the like. A minimum of about 5% on the weight of the tung oil is usually necessary to obtain the desired decolorization and deodorization. The amount may be increased as much as desired although, in general, quantities in excess of about 10% do not produce any marked increase in efficacy.

The finished product is a light straw color as compared with the rather dark yellow of a stabilized, thermolized oil. Odor is considerably reduced as compared both with raw tung oil and ordinary high-temperature stabilized oil and is very mild and inoffensive. Viscosity of the adsorbent-treated tung oil containing about 20 to 30% of a high-temperature treated portion is about Q to S, usually R, on the Gardner scale as compared with viscosities of Z4 to Z6 of the usual heat-stabilized oil.

The stabilized tung oil product, because of its low viscosity, freedom from impurities, light color which eliminates staining, and lack of offensive odor, is particularly suitable for therapeutic and cosmetic use.

Tung oil is a highly efficacious healing agent, apparently because it stimulates rapid growth and regeneration of new tissue. It is very effective for use topically in the treatment of dermatosis, burns, ulcerations, sprains, soreness, lacerations, surgical wounds and the like. The healing action is enhanced by the highly penetrative properties of the oil. Although the oil, of itself, is apparently not an antiseptic, it prevents the development of secondary infections, probably because of its stimulatory effect on the production of new tissue.

The tung oil is non-toxic and is markedly free from allergic reaction. For example, over 100 individuals, including 12 dermatological patients, a large group of high school students, a group of office workers and 18 tung mill workers received an application of tung oil on the forearm and were checked 24 hours later by a physician specializing in diseases of the skin. All tests were negative for primary irritation and sensitivity reaction.

The following chart summarizes clinical applications of tung oil and findings which demonstrate its therapeutic efficacy. The tung oil used was stabilized with a 25% portion which had been heated to 500° F.

(1) Simple lacerations; 56 cases; wound left open and oil applied every other day; average healing time—3 to 7 days; average disability time using tung oil—overall average of 0.48 day lost; average disability time, tung oil not used—same.

(2) Simple lacerations sutured; 157 cases; wound left open and oil applied every other day; average healing time—6 to 10 days; average disability time using tung oil—overall average of 0.48 day work lost; average disability time, tung oil not used—2 to 3 days lost.

(3) Severe trauma with lacerations; 43 cases; wound left open, light splint applied, oil applied every day for four days then every other day; average healing time—3 weeks; average disability time using tung oil—average 9 days work lost; average disability time tung oil not used—16 days lost.

(4) Severe trauma with small fractures and macerated tissue; 72 cases; wound left open, Tobruk-type cast or splint with window applied; oil applied every day for 5 days, then every other day; average healing time—4 to 6 weeks; overall average disability time using tung oil—21 days work lost; average disability time tung oil not used—34 days lost.

(5) Small fractures; 43 cases; light splint applied, massaged with oil every other day for one week, splint removed in one week, oil then massaged into fracture area every 3 days; average healing time—3 to 4 weeks; average disability time using tung oil—11 days work lost; average disability time tung oil not used—17 days lost.

(6) Severe sprains and contusions; 129 cases; oil massaged into wrenched joint and swollen tissues for 15 minutes, massage repeated daily; average healing time—7 to 12 days; average disability time using tung oil—5¾ days work lost; average disability time, tung oil not used—12 days lost.

(7) Sacroiliac strains; 30 cases; Regens position, sedation, reduced, and then oil massaged into back at sacroiliac area for 1 to 5 days; average healing time—1 to 5 days; average disability time using tung oil—3.3 days work lost; average disability time, tung oil not used—12 days lost.

(8) Varicose ulcers with recent industrial injury; 14 cases; treated the recent injury which in these 14 cases were contusions and also the ulcer area daily for 3 to 8 days; average healing time—in 3 to 8 days contusion was healed and ulcer improved; average disability time using tung oil—13 healed in average of 5 days with improvements in ulcer; average disability time, tung oil not used—3 weeks lost.

(9) Old sinuses and ulcerations on skin of feet and legs associated with old massive compound fractures; 6 cases; novacainized and curettement of sinuses, oil then poured into curetted sinuses daily for 5 days, after that twice a week; average healing time 1 to 3 months; average disability time using tung oil—6 weeks work lost; average disability time, tung oil not used—4 months.

(10) Abscesses with cellulitis and lymphangitis; 43 cases; abcesses incised, oil poured into abscessed area, cellulitis given gentle massage with oil daily; average healing time—14 to 16 days; average disability time using tung oil—8 days work lost; average disability time, tung oil not used—15 days.

(11) First degree burns; 9 cases; oil applied one day, patient told to use it several days; average disability time using tung oil—none; average disability time, tung oil not used—none.

(12) Second degree burns; 11 cases; oil applied daily for 3 to 6 days, patient told to continue using it; average healing time—3 to 6 days; average disability time using tung oil—4½ days work lost; average disability time, tung oil not used—9 days.

(13) Third degree burns; 11 cases; mild debridement, oil applied to burned area moderate pressure dressing (it was necessary to graft skin in 5 of these cases), burns dressed every 2 to 3 days and oil applied, 5 grafts dressed every 3 days and oil applied; average healing time—2½ to 8 weeks; average disability time using tung oil—6½ weeks work lost; average disability time, tung oil not used—3 months.

(14) Punctured wounds; 53 cases; oil rubbed in one time and applied to depth of wound; average healing time—1 day; average disability time using tung oil—none; average disability time, tung oil not used—3 to 4 days.

(15) Elective cases, chiefly removal of old scars, moles, cysts and biopsies of breasts, all closed by suture; 81 cases; oil poured into fresh wound, then suture taken, sutures removed on 6 to 10th day, non infection, all healing primary; average disability time using tung oil—none; average disability time, tung oil not used—5 days.

In the foregoing clinical test series, 763 cases were treated with tung oil, healing was complete and disability time was reduced an average of 50% as compared with similar cases treated by other methods.

Although this invention has been described with reference to illustrative embodiments thereof, it will be apparent to those skilled in the art that it may be embodied in other forms but within the scope of the appended claims.

I claim:

1. A process for stabilizing and refining tung oil which comprises treating tung oil at a temperature of about 170–190° F. with at least about 5% of a solid adsorbent for at least about 15 minutes to effect decolorization and deodorization without substantially increasing the viscosity of said oil; removing the solid adsorbent, heating a minor proportion comprising at least about 20% of the tung oil after said treatment with solid adsorbent to a temperature of about 475–500° F., said temperature being maintained for up to about 15 minutes, and combining said high-temperature treated portion with the major proportion of the adsorbent-treated oil the maximum temperature to which said major proportion of tung oil is subjected being about 190° F.

2. A process for stabilizing and refining tung oil which comprises treating tung oil at a temperature of about 170–190° F. with at least about 5% of a finely-divided solid adsorbent for at least about 15 minutes to effect decolorization and deodorization without substantially increasing the viscosity of said oil; removing the solid adsorbent, then heating to a temperature of about 475–500° F., said temperature being maintained for up to about 15 minutes, and then admixing a minor proportion comprising at least 20% of said high-temperature treated oil with a major proportion of tung oil which has been treated with a finely-divided solid adsorbent at a temperature of about 170–190° F., said temperature being the maximum temperature to which said major proportion of tung oil is subjected.

3. The process of claim 2 in which the solid adsorbent comprises at least about 5% to 10% of the tung oil.

4. The process of claim 3 in which treatment of the tung oil with the solid adsorbent is continued for about 15 to 30 minutes.

5. The process of claim 4 in which the proportion of high-temperature treated oil to oil treated at a maximum temperature of 170–190° F. is about 20 to 30%.

6. A process for stabilizing and refining tung oil which comprises treating tung oil at a temperature of about 180° F. for about 20 minutes with about 5 to 10% of a solid adsorbent comprising activated clay, removing the solid adsorbent, heating about 20 to 30% of said oil to a temperature of about 500° F. and then admixing said high-temperature treated oil with the tung oil which has been subjected to a maximum temperature of about 180° F.

7. The process of claim 5 in which the solid adsorbent is activated charcoal.

8. A stable, refined tung oil having a viscosity of about Q to S on the Gardner scale, and characterized by substantially less odor than the untreated oil and light color, said oil being substantially stable against formation of glyceryl-β-elaeostearate.

References Cited in the file of this patent

UNITED STATES PATENTS

| | | |
|---|---|---|
| 2,380,394 | Berger et al. | July 31, 1945 |
| 2,418,921 | Berger et al. | Apr. 15, 1947 |

OTHER REFERENCES

"Information on China Wood Oil," by G. H. Stevens (1924), p. 5.

Bailey: "Industrial Oil and Fat Products," published by Interscience (New York), 1951 (pp. 426–428 and 664 relied on).